United States Patent
Shemer et al.

(10) Patent No.: US 11,675,669 B2
(45) Date of Patent: *Jun. 13, 2023

(54) USING BUSINESS CONTINUITY AND DISASTER RECOVERY FOR ANY POINT IN TIME BACKUP

(71) Applicant: EMC IP HOLDING COMPANY LLC, Hopkinton, MA (US)

(72) Inventors: Jehuda Shemer, Kfar Saba (IL); Valerie Lotosh, Ramat-Gan (IL); Saar Cohen, Moshav Mishmeret (IL); Erez Sharvit, Ramat Gan (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/517,062

(22) Filed: Nov. 2, 2021

(65) Prior Publication Data
US 2022/0058089 A1 Feb. 24, 2022

Related U.S. Application Data

(63) Continuation of application No. 16/785,230, filed on Feb. 7, 2020, now Pat. No. 11,175,997.

(51) Int. Cl.
*G06F 12/16* (2006.01)
*G06F 11/14* (2006.01)

(52) U.S. Cl.
CPC ...... *G06F 11/1458* (2013.01); *G06F 11/1448* (2013.01); *G06F 2201/84* (2013.01)

(58) Field of Classification Search
CPC .................. G06F 11/1448; G06F 11/1458
USPC ............................................. 714/15
See application file for complete search history.

(56) References Cited

U.S. PATENT DOCUMENTS

| | | |
|---|---|---|
| 8,335,771 B1 | 12/2012 | Natanzon et al. |
| 8,478,955 B1 | 7/2013 | Natanzon et al. |
| 8,694,700 B1 | 4/2014 | Natanzon et al. |
| 8,954,796 B1 | 2/2015 | Cohen et al. |
| 9,032,160 B1 | 5/2015 | Natanzon et al. |
| 9,600,377 B1 | 3/2017 | Cohen et al. |
| 9,720,618 B1 | 8/2017 | Panidis et al. |
| 9,740,702 B2 | 8/2017 | Pawar et al. |
| 10,019,172 B2 | 7/2018 | Mitkar et al. |
| 10,061,657 B1 | 8/2018 | Chopra et al. |
| 10,101,943 B1 | 10/2018 | Ayzenberg et al. |

(Continued)

FOREIGN PATENT DOCUMENTS

EP 1959346 A2 8/2008
TW 202147787 A * 12/2021

OTHER PUBLICATIONS

International Search Report and Written Opinion received for PCT Patent Application No. PCT/US21/16395, dated May 14, 2021, 24 pages.

*Primary Examiner* — Chae M Ko
(74) *Attorney, Agent, or Firm* — Workman Nydegger

(57) ABSTRACT

Generating any point in time backups without native snapshot generation. Production data is split such that a journal stream is sent to a data protection system, which may be local or remote. The journal stream includes a data stream and a metadata stream. Backups are synthesized at the data protection system by rolling at least a portion of the journal. A backup for any point in time represented in the journal can be synthesized.

20 Claims, 4 Drawing Sheets

(56) References Cited

U.S. PATENT DOCUMENTS

| | | |
|---|---|---|
| 10,157,014 B1 | 12/2018 | Panidis et al. |
| 10,437,783 B1 | 10/2019 | Cohen et al. |
| 10,496,601 B1 | 12/2019 | Natanzon |
| 2006/0179343 A1 | 8/2006 | Kitamura |
| 2008/0109448 A1 | 5/2008 | Aboel-Nil et al. |
| 2010/0318812 A1 | 12/2010 | Auradkar et al. |
| 2015/0026422 A1 | 1/2015 | Dudgeon et al. |
| 2016/0283329 A1 | 9/2016 | Natanzon |
| 2017/0031783 A1 | 2/2017 | Kedem et al. |
| 2017/0083540 A1 | 3/2017 | Mamluk et al. |
| 2018/0210793 A1 | 7/2018 | Mamluk |
| 2018/0225052 A1 | 8/2018 | Rogers et al. |
| 2019/0065322 A1* | 2/2019 | Chakankar .............. G06F 16/27 |
| 2019/0340263 A1* | 11/2019 | Porat-Stoler ........ G06F 16/1752 |
| 2020/0409583 A1 | 12/2020 | Kusters et al. |
| 2021/0081432 A1 | 3/2021 | Grunwald et al. |

\* cited by examiner

USING BUSINESS CONTINUITY AND DISASTER RECOVERY FOR ANY POINT IN TIME BACKUP

FIELD OF THE INVENTION

Embodiments of the present invention generally relate to data protection and data protection operations. More particularly, at least some embodiments of the invention relate to systems, hardware, software, computer-readable media, and methods for data protection operations including any point in time backups.

BACKGROUND

Computing systems often store data that has substantial value. Any entity that has a problem with their data may experience economic issues, customer issues, trust issues, and the like. Consequently, the ability to protect data is an important aspect of many computing systems. The ability to restore data as quickly and with as little loss as possible reduces the scope and magnitude of the problems caused by problematic data.

Computing systems often employ virtual machines to run applications. Protecting virtual machines, however, can be difficult. Conventionally, snapshots are used to backup virtual machines. Performing snapshots, however, requires quiescing and stunning the virtual machines. This may disrupt the applications running on the virtual machines.

In addition, it is difficult to take frequent snapshots from a practical perspective. There are many system wide limits that impact the number of snapshots that can be taken. In fact, most systems are limited to taking snapshots in the range of minutes to hours. While mirroring systems can be used to compensate for the snapshot frequency, these solutions require substantial storage resources and are associated with significant management overhead.

All of these factors have an impact on an entity's recovery point objective (RPO). The RPO expresses a relationship between the time between backups and the amount of data that could be lost between backups. If the RPO of an entity is kept low, the entity is happier when data is corrupted or lost compared to a situation with a larger RPO. As a result, there is a need to improve the manner in which data is protected.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection operations. More particularly, at least some embodiments of the invention relate to systems, hardware, software, computer-readable media, and methods for data protection operations including backup operations, restore operations, image generation operations, replication operations, point in time (PiT) operations, deduplication operations, or the like or combination thereof.

Embodiments of the invention relate to systems and methods for performing backup operations including PiT operations. This includes generating, synthesizing, and/or storing images or snapshots or other backups on a secondary storage (e.g., DELL EMC Data Domain). Embodiments of the invention continuously replicate an IO stream. The replicated IO stream may be formatted as a journal that keeps the data and the metadata in separate streams. The journal is stored on the secondary storage device and backups can be generated or synthesized from the journal. This is achieved without performing snapshots on source data (thus native snapshots are not required). Embodiments of the invention are associated with significantly less overhead compared to native snapshots (which often require stunning and/or quiescing applications) and also allow any point in time backup functionality. Backups can also be stored on second tier storage.

Figure 1:
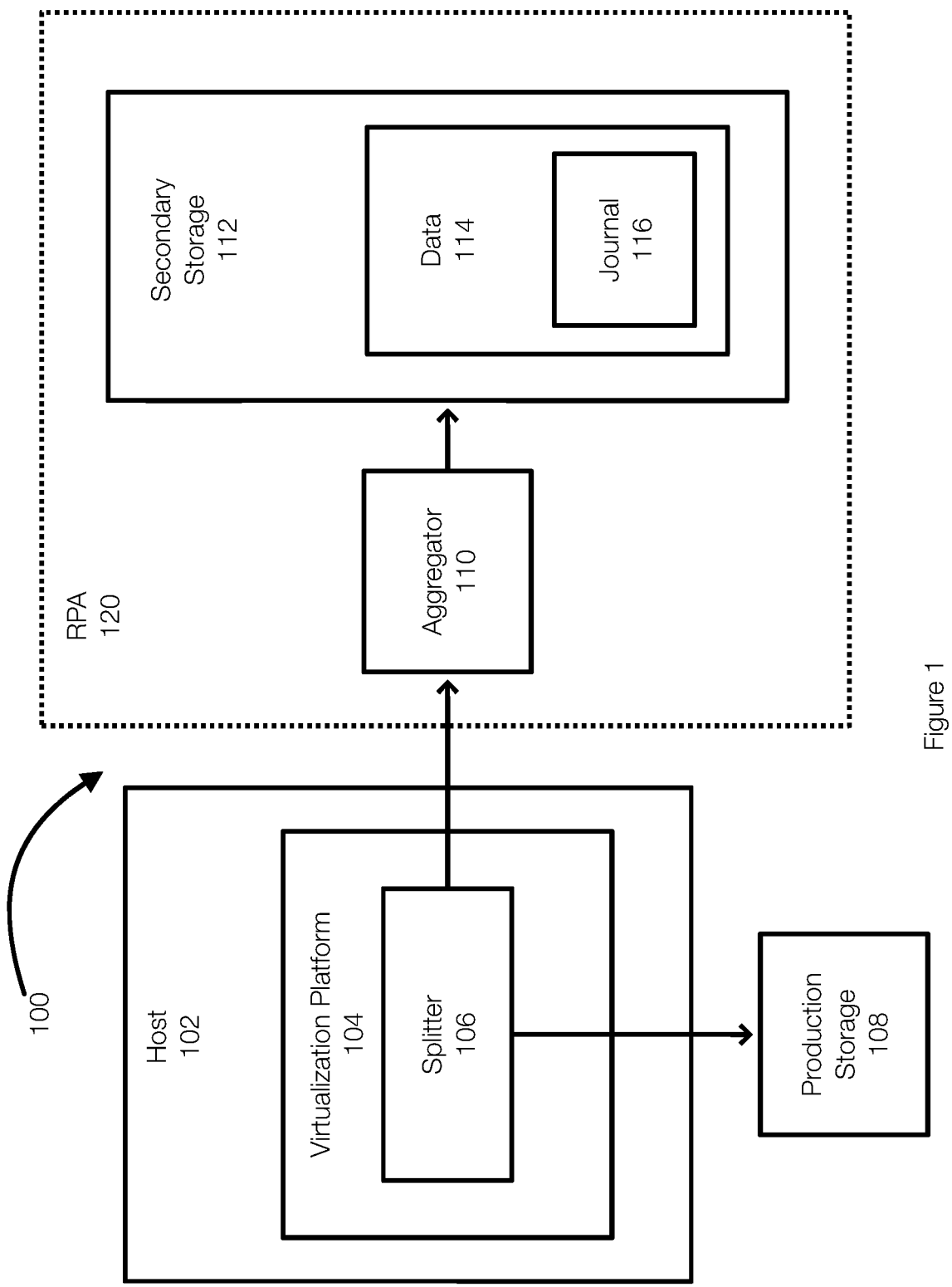
FIG. 1 illustrates an example of a data protection system configured to perform data protection operations and generate point in time backups without the use of native snapshots.

FIG. 1 illustrates an example of a computing environment in which embodiments of the invention may be implemented. FIG. 1 illustrates an example of a data protection system configured to generate PiT backups. The PiT backups can be synthesized from a journal and the PiT backups can be generated without requiring snapshots from a production site or system or application.

FIG. 1 illustrates a host 102. The host 102 may be a host machine, a virtual machine or other configuration. In this example, the host 102 may be a virtual machine operating with or on a virtualization platform 104. The virtualization platform 104 may be associated with multiple virtual machines and may virtualize hardware for those virtual machines. Hypervisors and VMware ESX and ESXi are examples of the virtualization platform 104. The virtualization platform 104 allows applications to be run in virtual machines on the host 102 or other hardware.

In this example, the virtualization platform 104 may be associated with a splitter 106. The splitter 106 may be embedded or operate within the virtualization platform 104 or as a separate layer. The splitter 106 is configured to replicate data and, by way of example only, may replicate data serially or in parallel. In effect, the splitter 106 intercepts IOs such as writes. The write is forwarded or passes through to the production storage 108. A copy of the data is sent to the data protection system.

More specifically, the splitter 106 may intercept writes to the production storage 108 and replicate the writes to an RPA (e.g., Recover Point Appliance) 120. The RPA 120 may be physical or virtual. The splitter 106 (which may be a mirror type arrangement) may replicate the data in parallel. When replicating or splitting in parallel, a copy of the data is sent to the RPA 120 in parallel or near-parallel with the data sent to the production storage 108. When splitting in parallel, the splitter 106 may not wait for an acknowledgement with regard to committing the write the production storage 108 before transmitting the data or a copy of the data to the RPA 120.

When transmitting or splitting serially, in one embodiment, the splitter may send the write to the production storage 108. After receiving an acknowledgment, the splitter 106 may then transmit the data or a copy of the data to the RPA 120. As discussed below, the acknowledgement may be sent by the aggregator 110 in some instances.

The RPA 120 may include the aggregator 110 and a secondary storage 112, which is an example of second tier storage in one example. The secondary storage may also include other components such as a processor and/or controller that allows for processing the data for storage and/or for synthesizing backups. Thus, the writes or the data stream coming from the splitter 106 may be committed to a journal 116 and stored in the secondary storage 112. The data 114 may include images or backups that are synthesized or generated from the journal 116. DELL DataDomain is an example of the RPA 120. The aggregator 110 may or may not be integrated with or be a part of the RPA 120. However, the aggregator 110 may be part of the RPA 120 and may be included in the data protection system.

In one example, the secondary storage 112 is deduplicated. For instance, the data 114 (which may include the journal 116) may be stored in a pool with signatures (e.g., hashes) calculated for each block or each datum. In other words, the data 114 stored in the secondary storage 112, by way of example only, includes the data blocks or chunks, signatures for each of the blocks, a journal, and backups or images. A volume in the storage may be a sequence of data signatures—similar to a list of pointers to the data. This allows every piece of data can be stored once and pointed to multiple times resulting in deduplication of the data across the secondary storage 112. Typically, the signatures are arranged in a tree structure. The journal may be stored using the signatures and is also deduplicated and does not take as much space as the data itself.

Data copy operations on storage systems such as the secondary storage 112 can be very efficient as the data itself need not be copied. Only the signatures need to be copied. This is an example of a fast copy. Advantageously, whole volumes can be copied in fractions of the time that a full copy would entail.

In systems that are deduplicated, such as the secondary storage 112 or, more generally, the RPA 120, the deduplication may occur at a fixed chunk size (e.g., 4K or 8K chunks or blocks). In addition, the deduplication is aligned to multiples of the chunk size. As a result, IOs or writes should be aligned at these boundaries. For a 4K chunk size, the s should be aligned at 0, 4K, 8K, 12K, etc., boundaries or addresses. If an IO is not aligned (e.g., a 4K IO is targeted to the address 2K), the IOs are refused or broken up along the alignment boundaries.

This can potentially cause problems at the target site at least because the target site (the RPA 120 or the secondary storage 112) may not have or have access to the data needed to complete the coverage of the full chunk. As a result, some IOs may need to be handled in certain manners. Unaligned chunks, IOs that are not a multiple of the chunk size, and IOs that are smaller than the chunk size are processed prior to or during the process of ingesting the chunks into the RPA 120 or into the secondary storage 112. The processing may occur at the splitter 106 for example or at the aggregator 110. These chunks may be processed to be aligned and to be of the proper size.

In one example, the host 102 (or an application or a virtual machine) may be associated with an IO pattern and data in the IO stream may not conform to the requirements of the RPA 120. Embodiments of the invention are equipped to handle different IO patterns.

Embodiments of the invention provide a schema or system for performing data protection operations including backup or replication operations without the use of native snapshots. Thus, a snapshot of the host 102 or of a virtual machine or application on the host is not required. A streaming IO source, which may be the splitter 106, captures or intercepts the IO stream being sent to the production storage 108. A copy of the IO stream is sent to the RPA 120. The copy may have a different format, however, than the IO stream that is intercepted.

The replicated data stored in this manner enables near zero RPO backups, any point in time backups, and does not require the source side to perform stunning or quiescing operations.

As illustrated in FIG. 1, example components of the data protection system may include a streaming IO source such as the splitter 106, an aggregator 110 and a journal 116. The journal 116 may be processed to create and manage backups stored in the data 114 on the secondary storage 112.

In some examples, IOs sent by virtual machines or hosts are sent to at least two locations. Mirroring devices and splitters, such as the splitter 106, achieve this result in similar ways. In either case, the original IOs arrive on the volume such as the production storage 108 and a second copy is introduced into the data protection system, such as the RPA 120.

There may be some differences when processing unaligned IOs if the IOs are sent in parallel to the two locations, or serially sent to one location and the then the other. The following discussion discusses a splitter 106 for replication for virtual machines, where the IOs may be processed serially.

In one example, the RPA 120 is configured to handle incoming data streams, such as incoming backup data streams. These data streams are typically large chunks of data. However, IOs coming from or received by the splitter 106 are dependent on an IO pattern associated with an application on the host or on a virtual machine that is generating the IOs. These IOs may have varying sizes and may not be optimally configured for consumption by the RPA 120. Thus, while IOs can be split and transmitted directly to the secondary storage 112, embodiments of the invention include an aggregator 110 that is configured to provide a buffer. More specifically, the aggregator 110 may aggregate or batch the IOs prior to sending to the secondary storage 112. Thus, the RPA 120 provides aggregation functionality.

IOs received from the splitter 106 are collected or buffered in a memory of the RPA 120 or in a temporary storage that can handle the load (e.g., VM VMDK, block storage, VSAN etc). Once enough IOs accumulate in the memory or the temporary storage used by the aggregator 110, the accumulated IOs are sent (e.g., in batches) to the secondary storage as a journal or a journal stream. This isolates the secondary storage 112 from high IOPs/small IO patterns and optimizes transmission to the secondary storage 112. The aggregated IO also complies or is processed to comply with the format associated with the journal 116. The aggregator 110 also aligns the IOs in a way that is best for consumption by the secondary storage 112.

More specifically, the aggregator 110 stores the incoming IO stream such that the IO data is aligned to deduplication boundaries. This helps ensure optimal deduplication once the accumulated IOs are pushed to the secondary storage 112. Aligning the IO stream, as discussed below, may include separating the IO stream into a data stream and a metadata stream.

As previously stated, certain IOs may require further processing. For example and in the case of a chunk size of 4K, if a 1K IO arrives, the splitter 106 may read 3K from the production storage 108 such that the IO has a 4K size. The resulting chunk can then be sent to the aggregator 110. The data read from the production storage 108 typically corresponds to the data adjacent the 1K data. Thus, the 1K IO and the 4K chunk are associated with the same address in the production storage 108 in one example.

If the splitter 106 does not compensate for small IOs, then the aggregator 110 can compensate for small IOs by reading from the production storage 108. When the arrives at the aggregator 110, the aggregator 110 may: not acknowledge the IO, read from the production storage 108, then acknowledge the original IO. This is typically performed when the splitter 106 splits serially.

When splitting serially, the splitter 106 or streaming source waits for the acknowledgment from the production data before sending the data to the aggregator 110. The aggregator may acknowledge separately. Complementing or compensating small IOs can introduce latency. However, unaligned IOs are typically rare.

Thus, the alignment of the IOs or write data is performed by the splitter 106 or the aggregator 110. More specifically, the data being replicated or backed up is prepared for storage in the secondary storage 112.

As previously stated, the journal may include a data stream and a metadata stream. Thus, the IO stream may be processed to generate this format. In one example, the journal sent by the splitter 106 or output by the aggregator 110 may include two streams: a data stream and a metadata stream.

Figure 2:
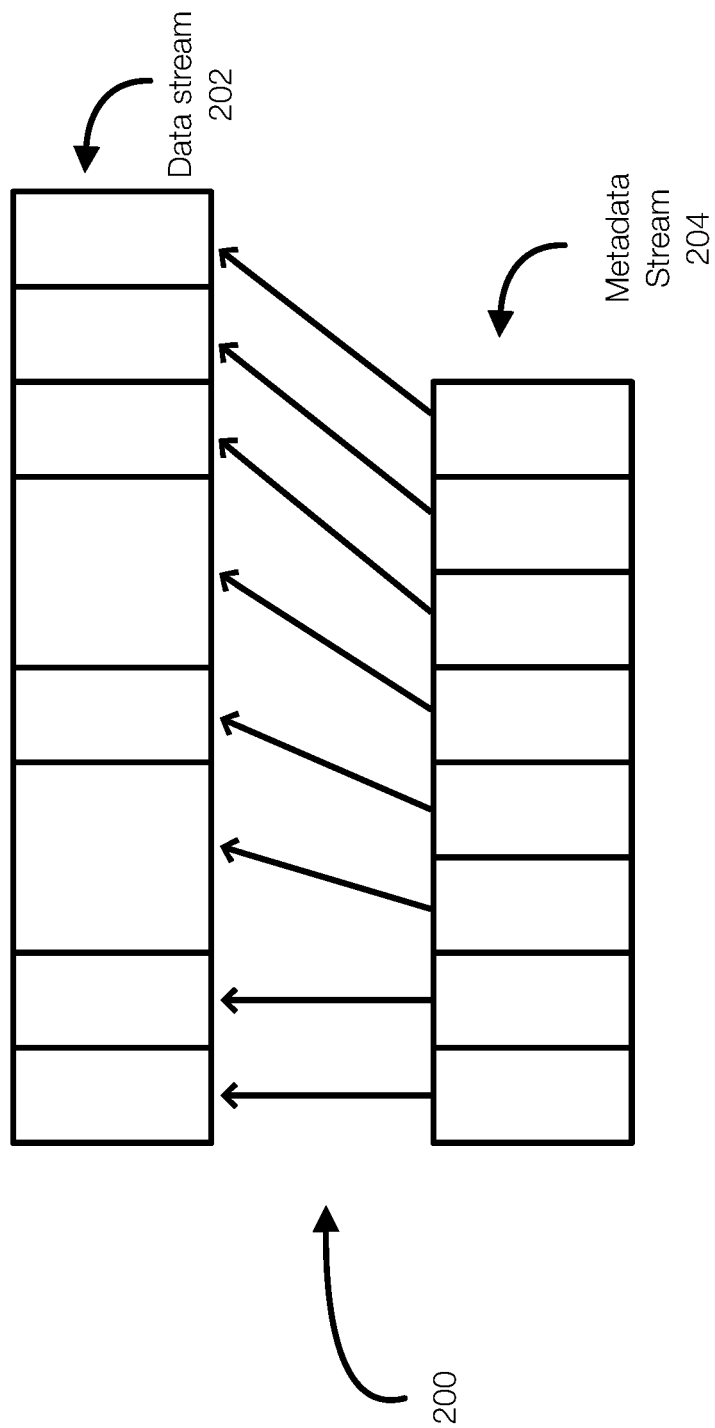
FIG. 2 illustrates an example of a journal used in generating point in time backups.

FIG. 2 illustrates an example of a data stream and a metadata stream that constitute an example journal. FIG. 2 illustrates that the journal 200 is divided into a data stream 202 and a metadata stream 204. In this example, both the data stream 202 and the metadata stream 204 are organized as incrementing in time lists of items. The data stream 202 contains the IOs. The IOs in the data stream 202 are aligned to deduplication boundaries. If the chunk size is 4K, each entry in the data stream 202 includes data whose size is a multiple of 4K. The metadata stream 204 stores IO metadata, which may include but is not limited to, IO volume, location, length, timestamps, tags, user provided data, and/or descriptive data. As illustrated in FIG. 2 each entry in the metadata stream 204 has a corresponding entry in the data stream 202.

Separating the journal 200 into a data stream 202 and a metadata stream 204 ensures that the IO alignment is not affected or impacted by the metadata.

In one example, the journal 200 can be stored in one or more files. In one example, the journal 202 can be divided into sections based on time intervals. The time intervals may or may not be uniform. However, the data stream 202 and the metadata stream 204 may divided at the same intervals. Each journal section (referred to as a journal file) includes a portion of the data stream 202 and a corresponding portion of the metadata stream 204.

Embodiments of the invention, as previously stated, generate backups without native snapshots. Rather, the images or backups can be generated or synthesized from the journal. More specifically, given a full backup at time T and a journal file that starts at time T and ends at time T+t, a backup can be synthesized for any point of time in the interval T+t. Because the data is deduplicated as previously discussed, the copy operations to create the new backup can be fast copy operations and are, as a result, efficient.

For example, to construct a backup at time T1, a copy of a full backup from time T may be used. The entries in the journal starting at time T and ending at time T1 are then applied to the full backup this is an example of rolling the journal or the journal file. This synthesizes a full backup at time T1. When copying the journal entries, the IOs from the journal are copied to the location specified in the metadata stream.

Because the IOs in the journal are stored in the order or arrival, rolling or applying the entries in the journal in order creates a correct representation of the data at time T1. In addition, because they are aligned in the journal, copying to the new backup will be a fast copy and will not take up more space. Even though the copy operations are fast copy operations (which copies fingerprints or signatures rather than the actual data), these operations still require time. The time is related to the amount of the journal that is being processed or rolled. Images or backups synthesized in this manner can be created at a specified cadence, in an ad hoc manner (e.g., in response to a client request), for internal purposes, disaster recovery purposes, business recovery purposes, or the like.

In one example, the secondary storage may be optimized for sequential IOs. The journal can be processed to accommodate the configuration of the secondary storage. In one example, the writes in the journal are sorted in an order that makes the writes more sequential while preserving write order fidelity. For example, the IOs can be sorted in increasing order based on the IO location or address. If two writes overlap (fully or partially), then the later IO (in terms of time) should be placed later in the sort. If an IO is fully covered by one or more later IOs, the IO that will be overwritten can be skipped at least because it will be overwritten.

Figure 3:
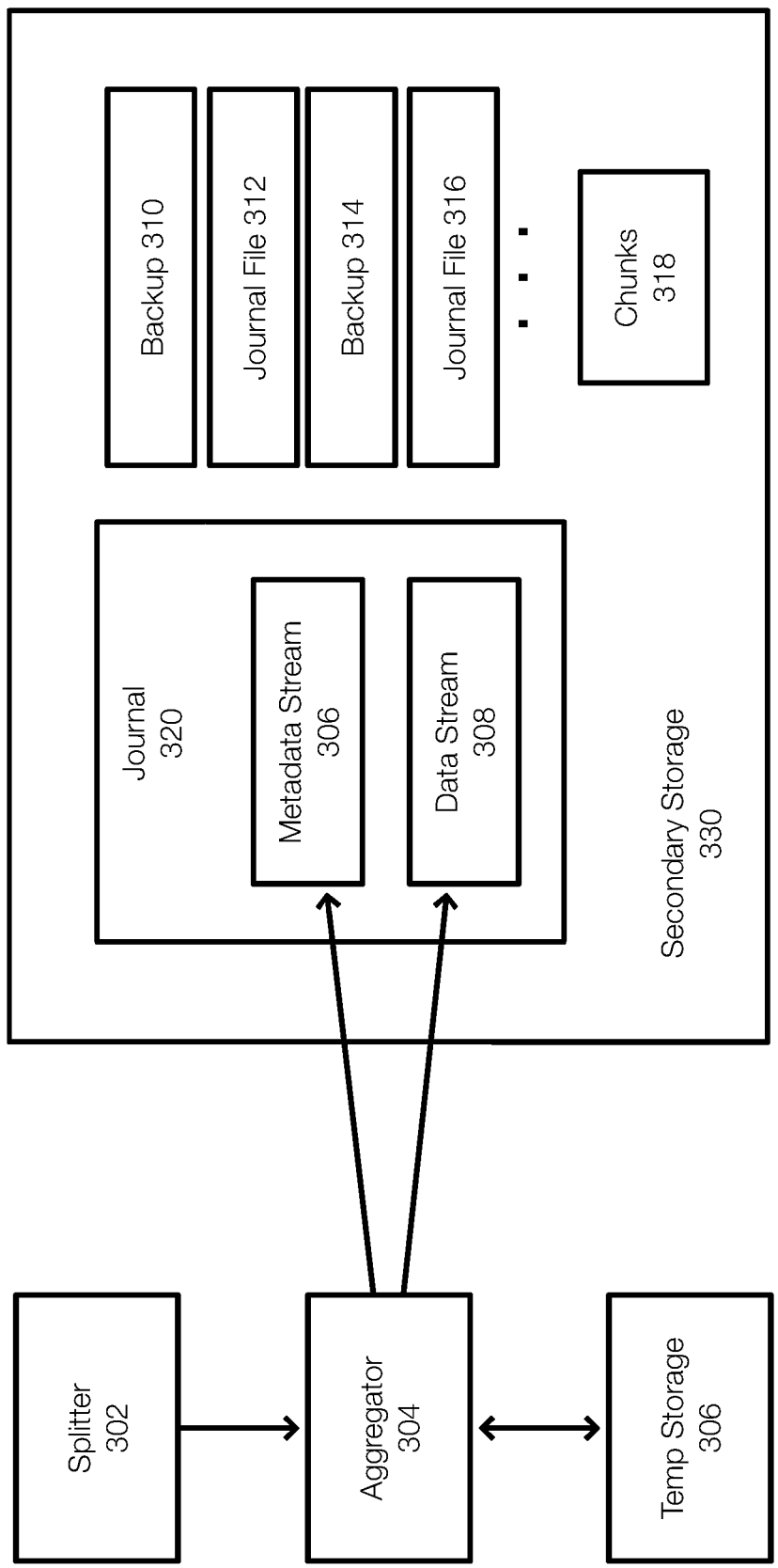
FIG. 3 illustrates an example of backups generated from a journal in a data protection system.

FIG. 3 illustrates a more detailed view of the data protection system and illustrates a manner in which backups and the journal are stored. FIG. 3 illustrates a splitter 302 that sends data to an aggregator 304. The aggregator 304 may send data streams that, together, constitute a journal.

The aggregator 304 may perform some processing such as performing boundary alignment as previously described and batching the data for large IO transfers to the secondary storage 330. The aggregator 304 may use a temp storage 306 for these purposes.

The aggregator may generate a stream that is representative of a journal. The journal 320 may include a metadata stream 306 and a data stream 308. The journal 320 can be used to generate or synthesize backups. FIG. 3 illustrates backups that may be synthesized at a particular cadence. The data or backups may include a backup 310, which may correspond to a time TO. Using the journal file 312, which corresponds to a time interval of the journal 320, the backup 314 can be generated from the backup 310 and the journal file 312. Thus, the backup 314 may correspond to a time T1. Using the backup 314 and the journal file 316, a backup corresponding to the time T2 can be generated. Thus, the journal or portions thereof can be used to synthesize backups. As previously stated, these backups may include signatures, which allows a fast copy to be performed. The actual chunks 318 may be stored in the secondary storage as well or in another storage.

In this example, the cadence at which the backups are generated can be balanced with the number of full backups and the desired RPO. A longer cadence may result in a higher RPO while a shorter cadence may lower the RPO but may also impact the secondary storage 330 capacity.

Stated differently, keeping a single full image and the journal is difficult because the time needed to roll the journal to a particular point in time could be substantial. Generating a full backup for every point in time would allow older images to be deleted. However, this approach may require substantial storage. Thus, the selection of the cadence can balance these competing concerns of the number of full backups and the journal rolling time.

The secondary storage 330 may also provide (e.g., via a controller or other manager) the ability to free space or storage. As backups age, the need for full resolution is diminished. In one example, older full backups can be kept and the corresponding journal files can be deleted at least because these journals are reflected in the full backups. Alternatively, older backups can be selectively deleted. Instead of having one per hour, the backups can be thinned to one per day, or one per week.

Recent images may be kept at full resolution. As a result, the more recent images provide any point in time functionality. This functionality is reduced as the images age. In one example and if all of the journal information is persisted, full images may be deleted without data loss (except the first backup). However, recovering a particular point in time may require considerable time to roll the journal.

Embodiments of the invention are able to generate full backups at a cadence. However, the decision of when to create a backup may not be determined by a cadence related to time. For example, a new backup may be generated based on the number of IOs or based on the amount of data in the journal. For example, a new backup may be generated for every 100 MB received. Alternatively, backups may be created based on processor/memory resources for rolling or based on expected rolling time. In another example, images can be created for compliance reasons or based on user requests. If there is a limit to parallelism of updating the image during the roll (for example due to the amount of write handles that can open a file), when fast copying the full backup, it can be split into multiple slabs (for example 16 GB slabs) and each slab can be processed in parallel. After the IOs have been rolled, the slabs are concatenated together to form the full backup. This is an optimization for rolling speed.

When rolling the image, the metadata can be analyzed to look for IOs that have been written multiple times in the interval being processed. Only the last one needs to be copied over.

Figure 4:
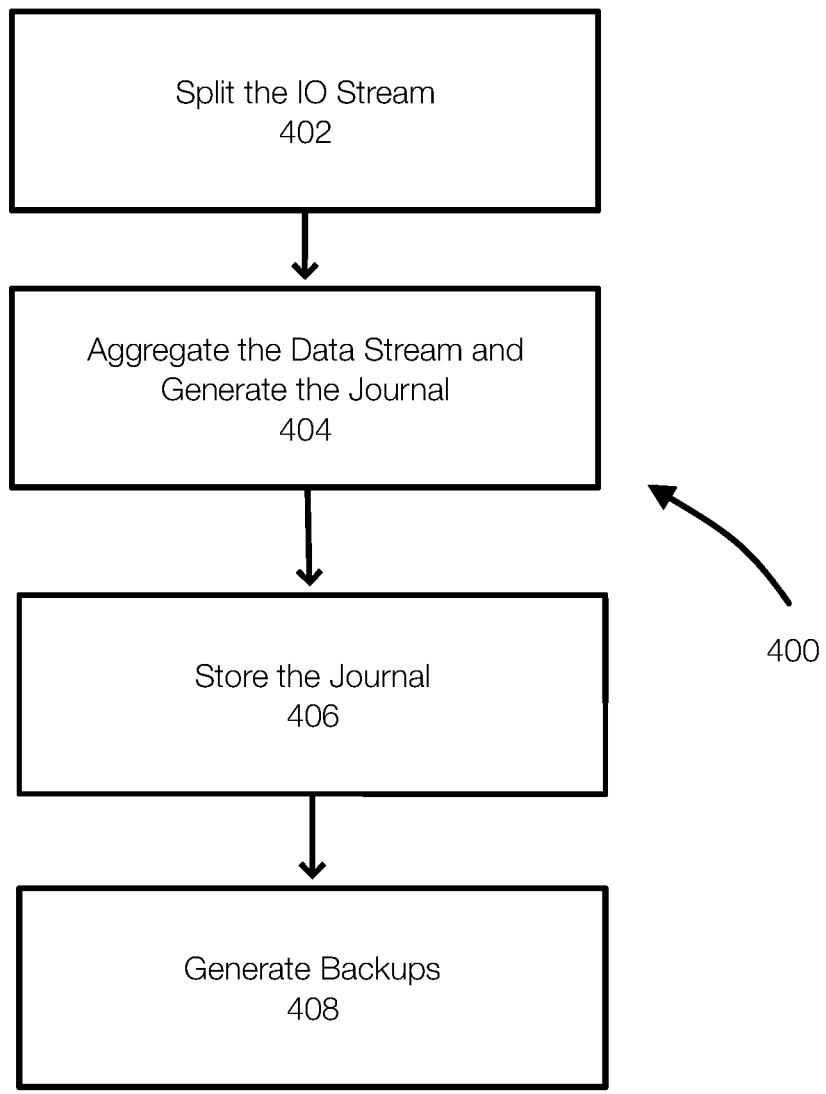
FIG. 4 illustrates an example of a method for generating any point in time backups.

FIG. 4 illustrates an example of a method for generating backups. The method 400 may begin by splitting 402 a source IO stream. The IO stream may occur at a host and may be associated with one or more applications. The IO stream may be associated with a specific volume or set of volumes. For example, the IO stream may include writes by an application to a production storage and the IO stream may be received by a splitter that splits the IO stream. The splitter may send the original IO stream to the production storage and a copy of the IO stream is transmitted to a data protection system or to an aggregator. The IO stream may be transmitted in accordance with an IO pattern of the source.

The IO stream is aggregated 404 by the data protection system or by an aggregator. Aggregating 404 the IO stream may include separating (if necessary or if not already performed by the splitter) the IO stream into a data stream and a metadata stream. The aggregator may also perform alignment and other functions as previously discussed. Together, the data stream and the metadata stream constitute the journal. The journal may be transmitted to the secondary storage. The journal is then stored 406 at the secondary storage. When storing the journal, the data stream and the metadata stream may be kept separate. In addition, the journal may be divided into journal files, where each journal file corresponds to an interval, which may be based on various factors such as time, data amount, RPO expectations, or the like or combination thereof.

Once the journal is stored (or while the journal is being stored at least because the journal is received as a stream and does not necessarily stop), backups may be generated 408 from the journal.

In one example, the data protection system is initiated with a full backup prior to a start of the journal. Then, by rolling the journal relative to the backup, a new backup can be generated. This process can continue such that the backups can be generated based on previous backups and the journal. Over time, portions of the journal and/or existing backups/images can be deleted.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, PiT backup generation operations. Such operations may include, but are not limited to, data read/write/delete operations, data deduplication operations, data backup operations, data restore operations, data cloning operations, data archiving operations, PiT operations, synthesis operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method, comprising splitting an IO stream received from a source, aggregating the IO stream and generating a journal from the IO stream, wherein the journal includes a data stream and a metadata stream, storing the journal in a secondary storage, and synthesizing backups from the journal.

Embodiment 2. The method of embodiment 1, further comprising generating the backups according to a cadence, wherein the cadence is based on at least one of time, journal size, expected journal roll time, expected RPO.

Embodiment 3. The method of embodiment 1 and/or 2, further comprising dividing the journal into journal files, wherein each journal file includes a portion of the data stream and a corresponding portion of the metadata stream.

Embodiment 4. The method of embodiment 1, 2 and/or 3, further comprising generating a new backup from a previous backup and one of the journal files.

Embodiment 5. The method of embodiment 1, 2, 3, and/or 4, further comprising aligning the metadata stream;

Embodiment 6. The method of embodiment 1, 2, 3, 4, and/or 5, further comprising performing a fast copy to synthesize each of the backups.

Embodiment 7. The method of embodiment 1, 2, 3, 4, 5, and/or 6, further comprising storing the backups as backups and journal files.

Embodiment 8. The method of embodiment 1, 2, 3, 4, 5, 6, and/or 7, further comprising setting a cadence for synthesizing the backups to balance an RPO with storage space.

Embodiment 9. The method of embodiment 1, 2, 3, 4, 5, 6, 7, and/or 8, further comprising retrieving additional data from production data when an IO is less than a block size.

Embodiment 10. The method of embodiment 1, 2, 3, 4, 5, 6, 7, 8, and/or 9, wherein the metadata stream includes one or more of IO volume, location length, timestamp, tagging, user information, descriptive data, wherein each entry in the metadata stream has a corresponding entry in the data stream.

Embodiment 11. The method as recited in any combination of embodiments 1-10, wherein the method is performed by a data protection system, a splitter, an aggregator, a processor, and/or secondary storage systems.

Embodiment 12. The method as recited in any of embodiments 1-11, wherein the secondary storage is dedupe storage, and another of the storage media types is object storage.

Embodiment 13. A method for performing any of the operations, methods, or processes, or any portion of any of these, disclosed herein.

Embodiment 14. A non-transitory storage medium having stored therein instructions that are executable by one or more hardware processors to perform the operations of any one or more of or portions of embodiments 1-13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud enviroment.

Any one or more of the entities disclosed, or implied, by the Figures and/or elsewhere herein, may take the form of, or include, or be implemented on, or hosted by, a physical computing device, one example of which is denoted at. As well, where any of the aforementioned elements comprise or consist of a virtual machine (VM), that VM may constitute a virtualization of any combination of the physical components.

In one example, physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
splitting an IO stream received from a source such that the IO stream is directed to production storage and to a data protection system;
aggregating the IO stream by splitting the IO stream directed to the data protection system into a data stream and a metadata stream, wherein the data stream and the metadata stream constitute a journal;
aligning chunks of data in the data stream such that each of the chunks has a chunk size;
storing the journal in a secondary storage; and
synthesizing backups using the journal and storing the synthesized backups in the secondary storage with the journal.

2. The method of claim 1, wherein aligning chunks of data includes ensuring that each chunk has a predetermined chunk size at least for deduplication.

3. The method of claim 1, further comprising, for IOs whose size is less than then chunk size, retrieving data from the production storage to add to the IOs such that the IOs size is the chunk size.

4. The method of claim 3, further comprising, for IOs whose size is greater than the chunk size, breaking the IOs into chunks each having the chunk size.

5. The method of claim 1, further comprising recovering data to any point in time represented by the journal and the synthesized backups, wherein points in time between synthesized backups correspond to a portion of the journal.

6. The method of claim 1, further comprising splitting the IO stream in parallel such that the IO stream directed to the data protection system is transmitted without waiting from an acknowledgement regarding committing the IO stream directed to the production storage.

7. The method of claim 1, further comprising splitting the IO stream serially such that the IO stream directed to the data protection system is not transmitted without an acknowledgement that the IO stream directed to the production storage has been committed.

8. The method of claim 1, The method of claim 1, further comprising generating the backups according to a cadence, wherein the cadence is based on at least one of time, journal size, expected journal roll time, and expected RPO.

9. The method of claim 1, further comprising dividing the journal into journal files, wherein each journal file includes a portion of the data stream and a corresponding portion of the metadata stream.

10. The method of claim 9, further comprising generating a new backup from a previous backup and one of the journal files.

11. The method of claim 1, further comprising aligning the metadata stream and deduplicating the data.

12. The method of claim 1, further comprising:
performing a fast copy to synthesize each of the backups;
storing the backups as backups and journal files; and
setting a cadence for synthesizing the backups to balance an RPO with storage space.

13. The method of claim 1, wherein the metadata stream includes one or more of IO volume, location length, timestamp, tagging, user information, descriptive data, wherein each entry in the metadata stream has a corresponding entry in the data stream.

14. A non-transitory storage medium having stored therein instructions that are executable by one or more hardware processors to perform operations comprising:
splitting an IO stream received from a source such that the IO stream is directed to production storage and to a data protection system;
aggregating the IO stream by splitting the IO stream directed to the data protection system into a data stream and a metadata stream, wherein the data stream and the metadata stream constitute a journal;
aligning chunks of data in the data stream such that each of the chunks has a chunk size;
storing the journal in a secondary storage; and
synthesizing backups using the journal and storing the synthesized backups in the secondary storage with the journal.

15. The non-transitory storage medium of claim 14, wherein aligning chunks of data includes ensuring that each chunk has a predetermined chunk size at least for deduplication.

16. The non-transitory storage medium of claim 14, further comprising, for IOs whose size is less than then chunk size, retrieving data from the production storage to add to the IOs such that the IOs size is the chunk size.

17. The non-transitory storage medium of claim 16, further comprising, for IOs whose size is greater than the chunk size, breaking the IOs into chunks each having the chunk size.

18. The non-transitory storage medium of claim 14, further comprising recovering data to any point in time represented by the journal and the synthesized backups, wherein points in time between synthesized backups correspond to a portion of the journal.

19. The non-transitory storage medium of claim 14, further comprising splitting the IO stream in parallel such that the IO stream directed to the data protection system is transmitted without waiting from an acknowledgement regarding committing the IO stream directed to the production storage.

20. The non-transitory storage medium of claim 14, further comprising splitting the IO stream serially such that the IO stream directed to the data protection system is not transmitted without an acknowledgement that the IO stream directed to the production storage has been committed.

* * * * *